(12) United States Patent
Kobayashi (10) Patent No.: US 8,923,391 B2
(45) Date of Patent: Dec. 30, 2014

(54) ENCODING APPARATUS, CONTROL METHOD FOR ENCODING APPARATUS AND PROGRAM

(75) Inventor: Masaaki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 530 days.

(21) Appl. No.: 13/070,305

(22) Filed: Mar. 23, 2011

(65) Prior Publication Data

US 2011/0235707 A1 Sep. 29, 2011

(30) Foreign Application Priority Data

Mar. 25, 2010 (JP) ................................ 2010-070327

(51) Int. Cl.
| | |
|---|---|
| *H04N 7/12* | (2006.01) |
| *H04N 7/14* | (2006.01) |
| *H04N 11/02* | (2006.01) |
| *H04N 11/04* | (2006.01) |
| *H04B 14/06* | (2006.01) |
| *H04N 19/61* | (2014.01) |
| *H04N 19/172* | (2014.01) |
| *H04N 19/152* | (2014.01) |
| *H04N 19/124* | (2014.01) |

(52) U.S. Cl.
CPC ... *H04N 19/00193* (2013.01); *H04N 19/00781* (2013.01); *H04N 19/00266* (2013.01); *H04N 19/0009* (2013.01)
USPC .................. 375/240.03; 375/240.22; 375/245

(58) Field of Classification Search
CPC ............. H04N 7/14; H04N 7/50; H04N 7/12; H04N 11/02; H04N 11/04; H04B 14/06
See application file for complete search history.

(56) References Cited

U.S. PATENT DOCUMENTS

| | | | |
|---|---|---|---|
| 7,570,823 B2 | 8/2009 | Nakamura | |
| 2004/0220804 A1* | 11/2004 | Odell | ............................. 704/230 |
| 2005/0024487 A1* | 2/2005 | Chen | .......................... 348/14.13 |
| 2006/0165168 A1* | 7/2006 | Boyce et al. | ............. 375/240.12 |

FOREIGN PATENT DOCUMENTS

| | | |
|---|---|---|
| JP | 10-336649 A | 12/1998 |
| JP | 2006-074347 A | 3/2006 |
| JP | 2006-109420 A | 4/2006 |

\* cited by examiner

*Primary Examiner* — Joseph Ustaris
*Assistant Examiner* — Maryam Nasri
(74) *Attorney, Agent, or Firm* — Canon U.S.A., Inc. IP Division (57) ABSTRACT

A control method for an encoding apparatus which performs bit rate control includes an acquiring step of acquiring a first quantization parameter as a quantization parameter to be used for quantizing a rate control unit, a first calculating step of calculating an evaluation value from a preset rate and a rate of an actually encoded rate control unit, a first setting step of, if the evaluation value is within a predetermined range, setting the first quantization parameter acquired by the acquiring step as a quantization parameter to be used for quantizing a rate control unit, and a second setting step of, if the evaluation value is not within the predetermined range, setting a second quantization parameter on the basis of the calculated evaluation value as a quantization parameter to be used for quantizing a rate control unit.

15 Claims, 6 Drawing Sheets

ENCODING APPARATUS, CONTROL METHOD FOR ENCODING APPARATUS AND PROGRAM

BACKGROUND OF THE INVENTION

1. Field of the Invention

The present invention relates to rate control for moving picture encoding.

2. Description of the Related Art

According to an encoding method which quantizes a DCT coefficient standardized with JPEG or H.264, for example, the quantization width of a DCT coefficient is changed frame by frame in encoding to reduce the bit rate of an image. The technology called rate control controls the bit rate of an image by changing the quantization width to fit into a designated rate.

Since the quantization width is a nonlinear value space with respect to the image quality or size, it is difficult to use the quantization width itself to control the rate. Thus, in real rate control, the calculation for rate control is performed with an easier-to-control numerical space called a quantization parameter, the quantization parameter is converted to a quantization width in order to quantize a DCT coefficient for encoding. As the value of the quantization parameter decreases, the image quality of the image to be acquired increases. However, the rate also increases. As the value increases, the image quality decreases. However, the rate also decreases. On the other hand, for example, Japanese Patent Laid-Open No. 2006-109420 discloses a method for controlling a quantization parameter such that the product of the rate and the quantization parameter can be a constant value.

In rate control for video encoding, the balance between the image quality and the rate is adjusted for each frame, block or both for determining the quantization parameter, and the rates of a plurality of frames are serially controlled to fit into a predetermined rate. For example, if it is estimated that the rate (real bit rate) will be larger than a designated rate when a frame or a block is started to encode, the quantization parameter is reduced for the encoding. Conversely, if it is estimated that the real bit rate will be smaller than the designated rate, the quantization parameter must be increased for the encoding. The real bit rate here is handled as a bit rate of streams generated by encoding images up to the previous frame or previous block. When the final frame is finished to encode, the bit rate of streams itself is the real bit rate.

Various quantization parameter calculation methods have been proposed in the past. For example, Japanese Patent Laid-Open No. 2006-74347 describes calculation of a quantization parameter on the basis of occupancy of a buffer and the complexity of an image.

Quantization noise is perceived when image quality deteriorates because the quantization parameter is increased for encoding. In this case, when the quantization parameter rapidly varies in time, the quantization noise increases or decreases. This flickers the quantization noise.

SUMMARY OF THE INVENTION

The present invention can suppress the variation of a quantization parameter and reduce flickering of quantization noise.

According to an aspect of the present invention, there is provided a control method for an encoding apparatus which performs bit rate control includes an acquiring step of acquiring a first quantization parameter as a quantization parameter to be used for quantizing a rate control unit, a first calculating step of calculating an evaluation value from a preset rate and a rate of an actually encoded rate control unit, a first setting step of, if the evaluation value is within a predetermined range, setting the first quantization parameter acquired by the acquiring step as a quantization parameter to be used for quantizing a rate control unit, and a second setting step of, if the evaluation value is not within the predetermined range, setting a second quantization parameter on the basis of the calculated evaluation value as a quantization parameter to be used for quantizing a rate control unit.

The present invention can suppress the variation of a quantization parameter and reduce flickering of quantization noise.

Further features of the present invention will become apparent from the following description of exemplary embodiments with reference to the attached drawings.

DESCRIPTION OF THE EMBODIMENTS

[First Embodiment]

With reference to attached drawings, the present invention will be described in details on the basis of embodiments below. The configurations of the embodiments below are given for illustration purposes only, and the present invention is not limited to the illustrated configurations.

Figure 1:
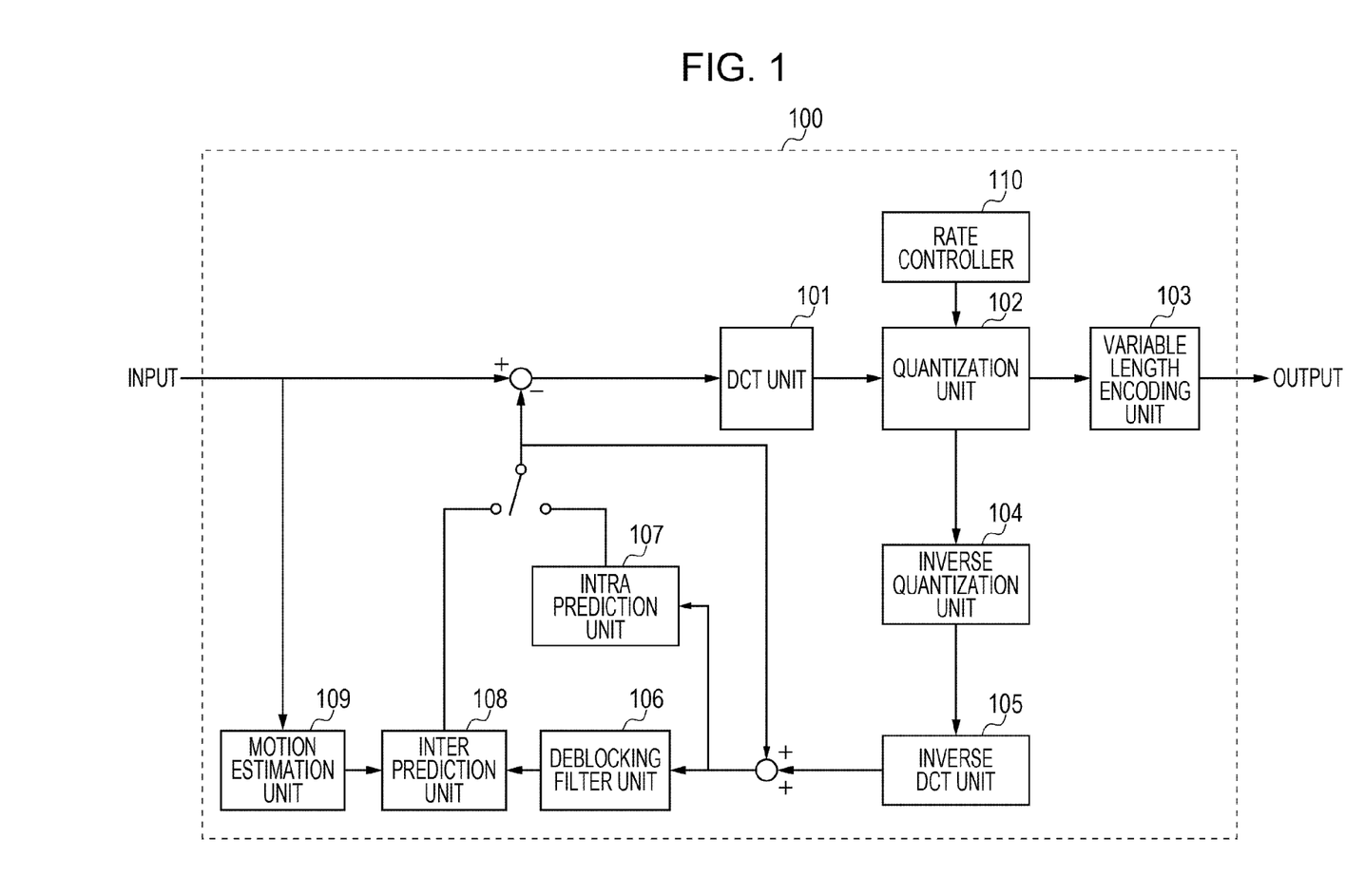
FIG. 1 is a block diagram of an encoding apparatus.

FIG. 1 illustrates an example of an encoding apparatus according to a first embodiment of the present invention. An encoding apparatus 100 includes a DCT unit 101, a quantization unit 102, a variable length encoding unit 103, an inverse quantization unit 104, an inverse DCT unit 105, a deblocking filter unit 106, an intra estimation unit 107, an inter estimation unit 108, a motion estimation unit 109, and a rate controller 110. Operations by an encoding apparatus having this configuration will be described below.

First of all, there will be described the encoding on an intra-macro block which can be decoded only with data within a frame. A macro block is generally a 16×16 pixel block and includes a plurality of blocks each of which is a unit of DCT conversion or intra estimation, which will be described below. The difference value between the pixel value of each macro block to be encoded in an input video signal and a pixel estimation value of a macro block to be encoded which is generated in the intra estimation unit 107 is calculated pixel by pixel to generate a 16×16 pixel difference value block.

Next, the difference value block is DCT converted by the DCT unit 101. This processing is generally performed in 4×4 pixel or 8×8 pixel block, and coefficient data of the frequency component is output. The coefficient data is input to and is quantized in the quantization unit 102. The quantized coefficient data is variable-length encoded by the variable length encoding unit 103. The quantized coefficient data is further decoded by the inverse quantization unit 104 and inverse DCT unit 105 and is added to the pixel estimation value of the macro block pixel by pixel and is converted to a 16×16 decoded pixels. The resulting decoded pixels are input to the intra estimation unit 107. The intra estimation unit 107 generates pixel estimation values for surrounding macro blocks to be encoded later.

Next, the encoding on an inter macro block by using estimation between frames will be described. The motion estimation unit 109 performs matching processing between the present block to be encoded (unit block for motion compensation) and base frame pixels and a vector value is thus calculated for minimum error. On the basis of the motion estimation result, the difference value between the pixel estimation value for the macro block to be encoded which is output by the inter estimation unit 108 and the pixel value of the macro block to be encoded in the video signal is calculated and is input to the DCT unit 101. The subsequent processing is basically the same as the intra-macro block encoding. The coefficient decoded in the inverse DCT unit 105 is added to the pixel estimation value for the macro block pixel by pixel. The resulting decoded pixels are input to the inter estimation unit 108 through the deblocking filter unit 106 in order to reduce visual block distortion.

The rate controller 110 calculates a quantization parameter to be used in the quantization unit 102. The rate controller 110 determines a quantization parameter for each frame such that the real bit rate can be 90% of the designated rate.

Figure 2:
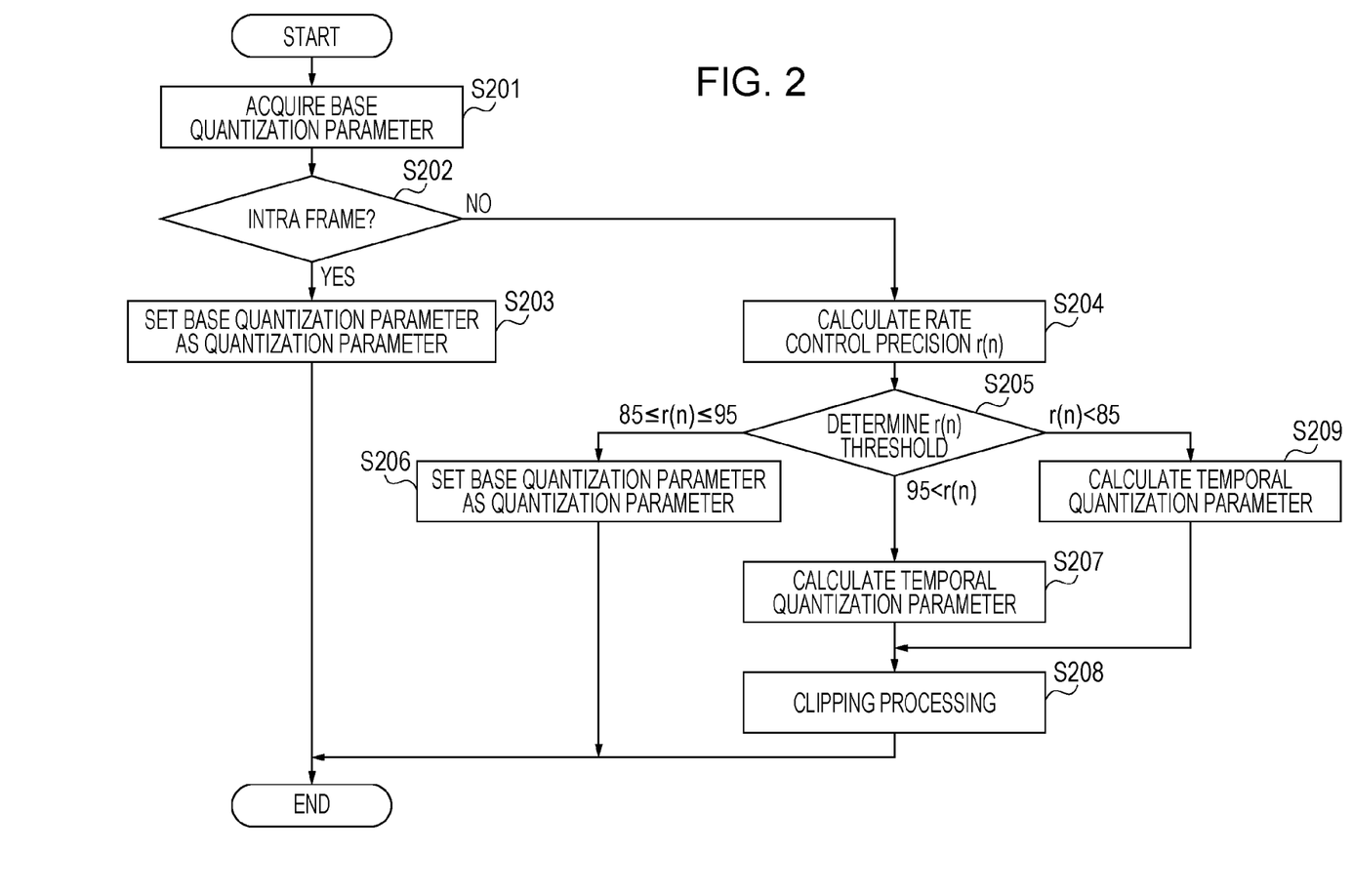
FIG. 2 is a flowchart of control in a rate control unit.

FIG. 2 is a flowchart of a method of calculating a quantization parameter in the rate controller 110.

In step S201, the rate controller 110 acquires a base quantization parameter (base_qp) as a quantization parameter to be used for quantizing a frame to be encoded. According to this embodiment, the base quantization parameter is acquired by averaging the quantization parameters used in the previous GOP encoding.

Next, in step S202, the rate controller 110 determines whether the frame to be quantized in the quantization unit 102 is an intra frame or an inter frame. If it is an intra frame, the processing moves to step S203. If it is an inter frame, the processing moves to step S204.

Next, in step S203, the rate controller 110 sets the base quantization parameter acquired in step S201 as a quantization parameter to be used for quantizing the frame to be encoded.

In step S204, the rate controller 110 calculates a rate control precision r(n). The rate control precision r(n) is an evaluation value for the rate up to the nth frame within the GOP currently being encoded and is the proportion of the real bit rate against the designated rate. If r(n)=100, the real bit rate is equal to the designated rate. If r(n)>100, the real bit rate is higher than the designated rate. If r(n)<100, the real bit rate is lower than the designated rate.

For example, if the designated rate is a value that is closer to a maximum value of a buffer volume in a decoder and when the rate control precision of the GOP exceeds 100, the buffer in the decoder may possibly overflow. Thus, it is important to control the rate control precision so as to be equal to or lower than 100. Conversely, if the rate control precision of the GOP is excessively low, the encoding is performed with the assigned rate or lower, which affects the image quality. Therefore, it is important to control the rate control precision so as to be a value as high as possible equally to or under 100.

The rate control precision r(n) is calculated by:

$$r(n) = \frac{\sum_{k=i(n)-1}^{n-1} \text{frame\_byte}(k)}{\text{gop\_byte}(n-1) - \text{frame\_byte}(i(n))} \times 100 \quad \text{[Expression 1]}$$

where r(n)=100 if n−1=i(n).

$$\text{gop\_byte}(n) = \frac{\text{target\_bit\_rate} \times \text{size\_gop}(n)}{8 \times \text{frame\_rate}} \quad \text{[Expression 2]}$$

The variables in Expression 1 will be described below. The target_bit_rate is a pre-designated rate (bps). The frame_rate is a video frame rate. The size_gop(n) is the number of frames of a GOP containing the frame to be encoded (the nth frame) and is a constant if encoding is performed on a fixed GOP. The i(n) is the frame number of the immediately preceding intra frame of the nth frame (the intra frame itself if the nth frame is an intra frame). The frame_byte(n) is an actual frame size of the nth frame expressed in bytes. The gop_byte(n) is the size of the target GOP calculated from the designated rate including the nth frame expressed in bytes.

The rate control precision r(n) in other words exhibits the inter frame rate control precision resulting from the multiplication of the proportion of the total of real frame sizes from the (i(n)+1)th frame to the (n−1)th frame against the total of target frame sizes by 100. The rate control precision r(n) immediately after an intra frame has not undergone inter frame encoding, and the rate control precision is difficult to calculate. Thus, it is assumed that it is r(n)=100 for convenience.

Next, in step S205, the rate controller 110 performs threshold value determination on the r(n) calculated in step S204. If r(n) is equal to or higher than 85 or equal to or lower than 95, the processing moves to S206. If r(n) is higher than 95, the processing moves to S207. If r(n) is lower than 85, the processing moves to S209.

In step S206, the rate controller 110 sets the base quantization parameter acquired in step S201 as the quantization parameter for the input frame.

In step S207, the rate controller 110 calculates a temporal quantization parameter qpt(n) which increases its value with respect to the base quantization parameter (base_qp) by using:

$$qp_1(n) = (r(n)-95)/10 + \text{base\_}qp \quad \text{[Expression 3]}$$

In step S208, the rate controller 110 performs clip function processing which returns 0 and 51 if the value of qpt(n) is lower than 0 or is higher than 51 and returns the qpt(n) as it is for the other values to calculate the quantization parameter qpt(n).

$$qp(n) = \text{CLIP}(0, 51, qp_1(n)) \quad \text{[Expression 4]}$$

In step S209, the rate controller 110 calculates a temporal quantization parameter qpt(n) which decreases its value with respect to the base quantization parameter base_qp by using:

$$qp_1(n) = (r(n)-85)/10 + \text{base\_}qp \quad \text{[Expression 5]}$$

Figure 3:
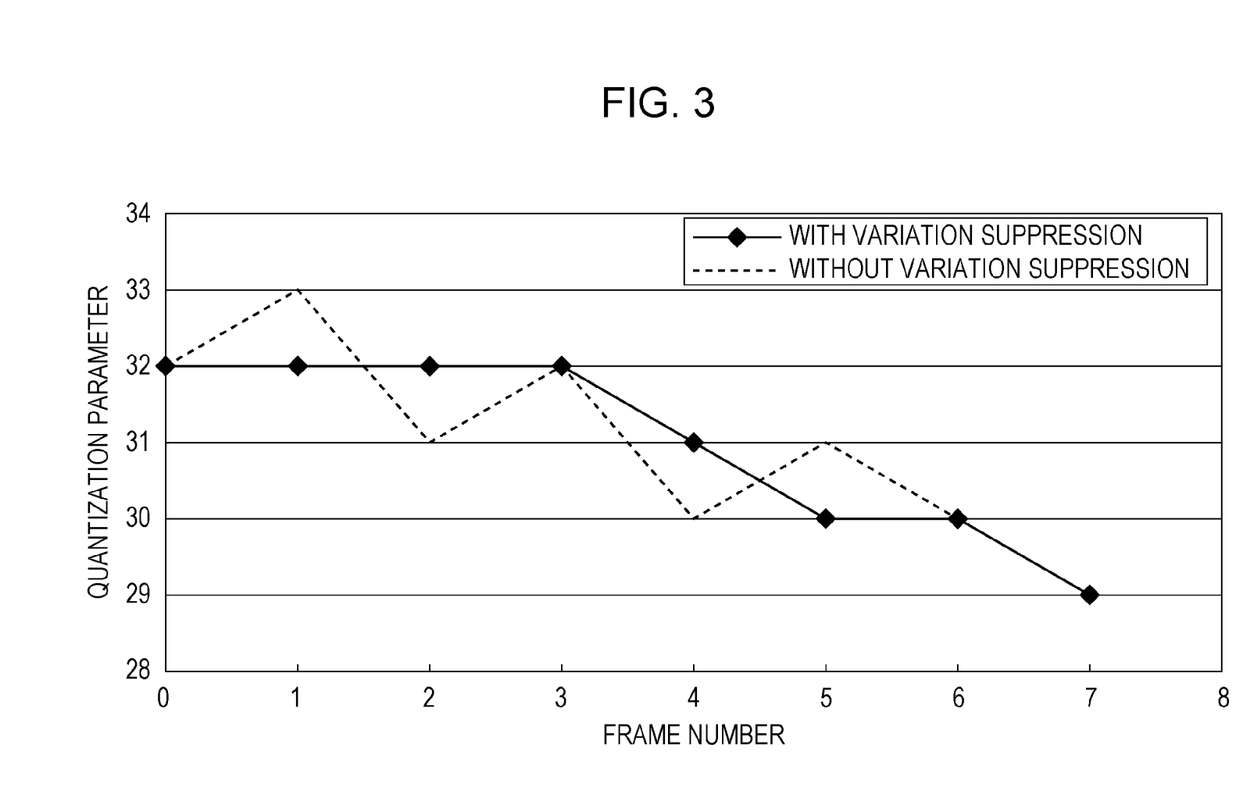
FIG. 3 illustrates a variation example of a quantization parameter.

The rate control by the rate controller 110 by following the flow above can keep the rate control precision r(n) in the variation suppression section (85≤r(n)≤95) and allows suppression of variations in n(qp) with respect to the base quantization parameter. FIG. 3 illustrates how the processing suppresses variations of the quantization parameter.

Thus, according to this embodiment, the quantization noise flickering can be suppressed. According to this embodiment, in order to control such that the real bit rate can be 90% of the designated rate, the variation suppression section is set in the vicinity of 90. However, the variation suppression section may be controlled in the vicinity of 100 if the real bit rate may exceed the designated rate in an acceptable error range.

According to this embodiment, the base quantization parameter is the quantization parameter of the precious GOP of the GOP containing the frame to be encoded. However, for example, in 2-pass encoding, the quantization parameter calculated on the basis of the encoded information acquired in the first pass. In general, it is considered that the base quantization parameter calculated in 2-pass encoding has high rate control precision. However, even the technology controls the quantization parameter with low precision from 0 to 51 in H.264, for example, it is difficult to keep the same quantization parameter for a plurality of frames and at the same time keep the rate control precision equal to 100 since the quantization parameter is controlled with the rough precision from 0 to 51. For that reason, the quantization parameter must be controlled frame by frame. However, when the quantization parameter is controlled, the parameter value varies, causing flickering of quantization noise. Therefore, the suppression of variation of the quantization parameter according to this embodiment is effective.

According to this embodiment, the quantization parameter is controlled frame by frame, and blocks within a frame are encoded with an equal quantization parameter, for example. However, the present invention is not limited to the frame-by-frame control, but the control may be performed block by block. In this case, the rate control precision r(n) is calculated block by block.

Having described that an intra frame is inserted at an equal interval, the processing according to this embodiment may detect a scene change frame and handle it as an intra frame. When it is assumed that a GOP is a set from an intra frame to the immediately previous frame of the next intra frame, as described above, the basic flow by the rate controller 110 is the same except that gop_byte(n) and size_gop(n) are adjusted in accordance with the position of the scene change detection.

The variation suppression section of this embodiment is not limited to the constant value in Expression 3, but the equivalent effect may be provided by:

$$qp(n) = \begin{cases} (r(n)-100)/10 + \text{base\_qp} + 0.5 & r > 100 \\ (r(n)-90)/20 + \text{base\_qp} & 80 \le r \le 100 \\ (r(n)-80)/10 + \text{base\_qp} - 0.5 & r < 80 \end{cases}$$ [Expression 6]

for example, if the change in quantization parameter can be suppressed within a predetermined range.

According to this embodiment, H.264 is used for encoding. However, the present invention is not limited thereto, but other moving picture encoding methods such as MPEG-2 may be used. Having described the method which uses an I frame and a P frame, the present invention is also applicable to a method using a B frame.

Having described according to this embodiment that the rate control precision is calculated as rate control precision for an inter frame, the present invention is not limited thereto. The same effect can be provided by further calculating the size of an intra frame.

[Second Embodiment]

According to this embodiment, a quantization parameter according to the first embodiment is further corrected.

Figure 4:
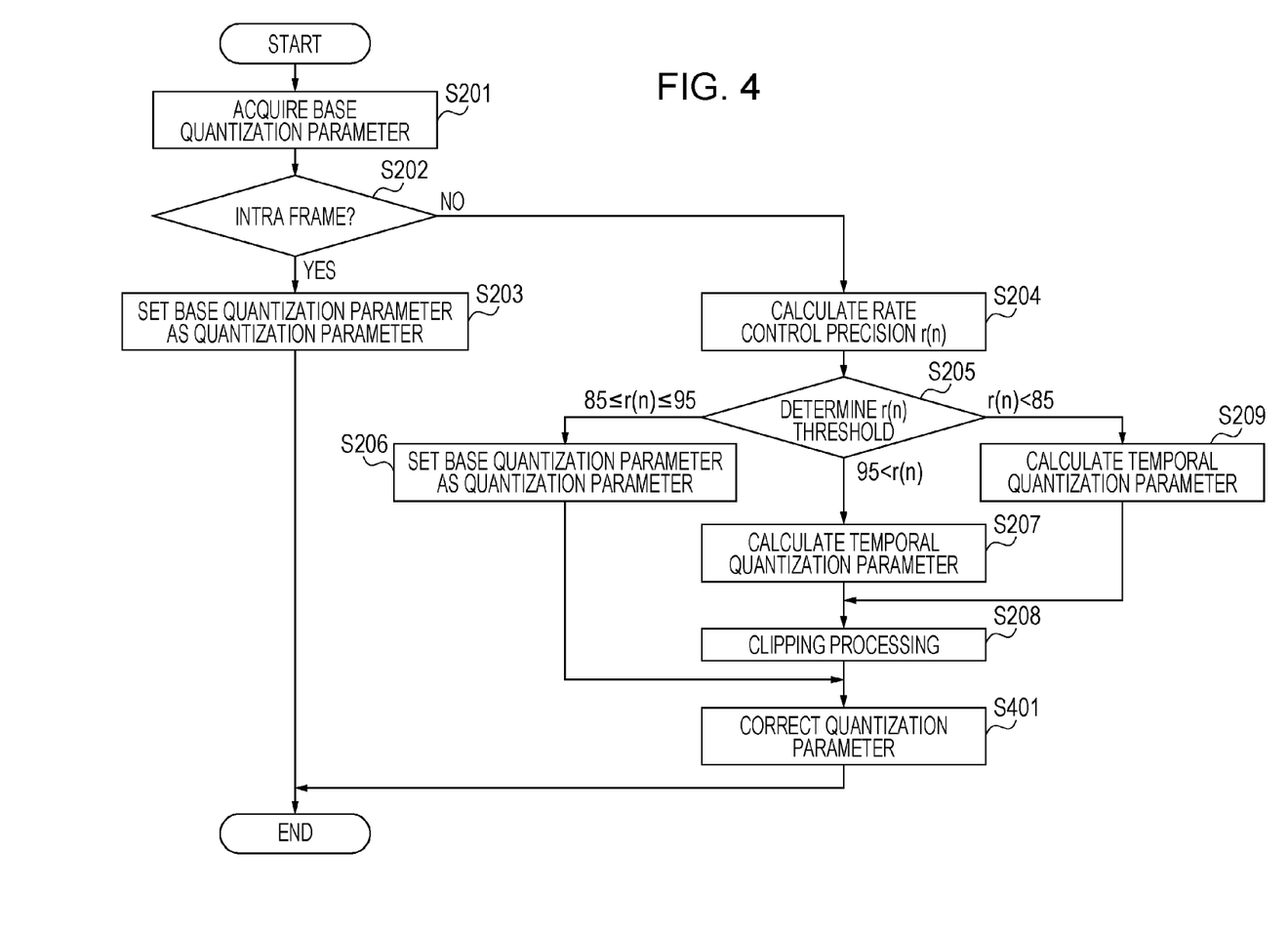
FIG. 4 is a flowchart of control in a rate control unit of a second embodiment.

FIG. 4 is a flowchart of a method of calculating a quantization parameter in a rate controller 110 of this embodiment. In the flowchart, step S201 to S208 are the same as those in the flowchart in FIG. 2 according to the first embodiment. In step S401, the rate controller 110 corrects the quantization parameter qp(n) calculated in step S204 by using:

$$qp_1(n) = \left(\sum_{i=1}^{L} qp_1(n-i)\right) / 8 + qp(n)/2$$ [Expression 7]

The correction using Expression 7 can further smooth the variations in quantization parameter and can suppress medium and long variations.

[Third Embodiment]

According to this embodiment, the quantization parameter calculation method according to the first embodiment further includes the step of changing the variation suppression method in accordance with the number of frames from the nth intra frame.

Figure 5:
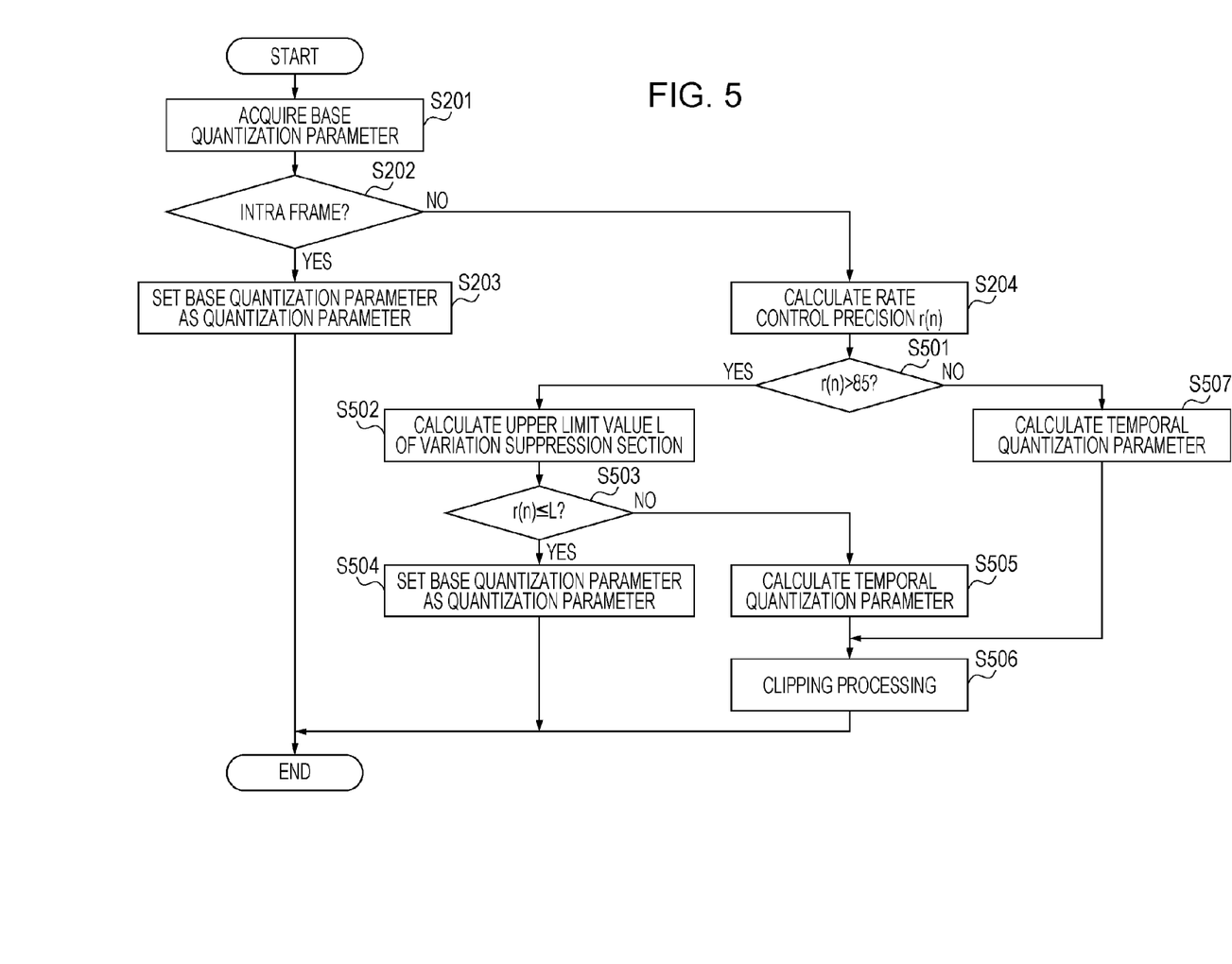
FIG. 5 is a flowchart of control in a rate control unit of a third embodiment.

FIG. 5 is a flowchart of a quantization parameter calculation method in a rate controller 110 of this embodiment. In the flowchart, steps S201 to S204 are the same as those in the flowchart in FIG. 2 according to the first embodiment.

In step S501, the rate controller 110 determines whether r(n) is higher than 85 or not. If r(n) is higher than 85, the processing moves to step S502. If r(n) is lower than 85, the processing moves to step S507.

In step S502, the rate controller 110 calculates an upper limit value L of a variation suppression section. The upper limit value L increases when the number of frames from an intra frame to the frame to be encoded is low. The calculation is performed by using:

$$L = \begin{cases} 150 & N_{gop}(n) \le 3 \\ 95 & N_{gop}(n) > 3 \end{cases}$$ [Expression 8]

In step S503, the rate controller 110 determines whether r(n) is lower than an upper limit value L of the variation suppression section. If r(n) is lower than L, the processing moves to step S504. If r(n) is higher than L, the processing moves to step S505.

In step S504, the rate controller 110 sets the base quantization parameter acquired in step S201 as a quantization parameter for the input frame.

In step S505, the rate controller 110 calculates a temporal quantization parameter qpt(n) which increases its value with respect to the base quantization parameter base_qp by using:

$$qp_1(n)=(r(n)-L)/10+\text{base\_}qp$$ [Expression 9]

In step S506, the rate controller 110 performs clip function processing similarly to step S208 of the first embodiment to calculate the quantization parameter qpt(n).

In step S507, the rate controller 110 calculates a temporal quantization parameter qpt(n) which decreases its value with respect to the base quantization parameter base_qp by using:

$$qp_1(n)=(r(n)-85)/10+\text{base\_}qp$$ [Expression 10]

The r(n) immediately after an intra frame (such as one after three or fewer frames from the intra frame) may vary in value more often than the r(n) after more frames from the intra frame (such as three or more frames from the intra frame).

This is due to the lower number of samples of the frame rates for calculation of rate control precision. Accordingly, immediately after an intra frame (after the predetermined three frames according to this embodiment), the quantization parameter variation suppression section is extended to suppress unnecessary variations in quantization parameter. After the variations in quantization parameter converge (after the frames subsequent to the predetermined three frames according to this embodiment), the control is returned to the normal variation suppression section.

While the upper limit value of a variation suppression section is only controlled according to this embodiment, the present invention is not limited thereto. A lower limit value may be controlled.

[Fourth Embodiment]

According to the aforementioned embodiments, it has been described the components of the apparatus illustrated in FIG. 1 are all configured by hardware. However, the components may be configured by computer programs. In this case, a computer having a memory which stores the computer programs, a CPU which executed the computer programs stored in the memory is applicable to an encoding apparatus according to the aforementioned embodiments.

Figure 6:
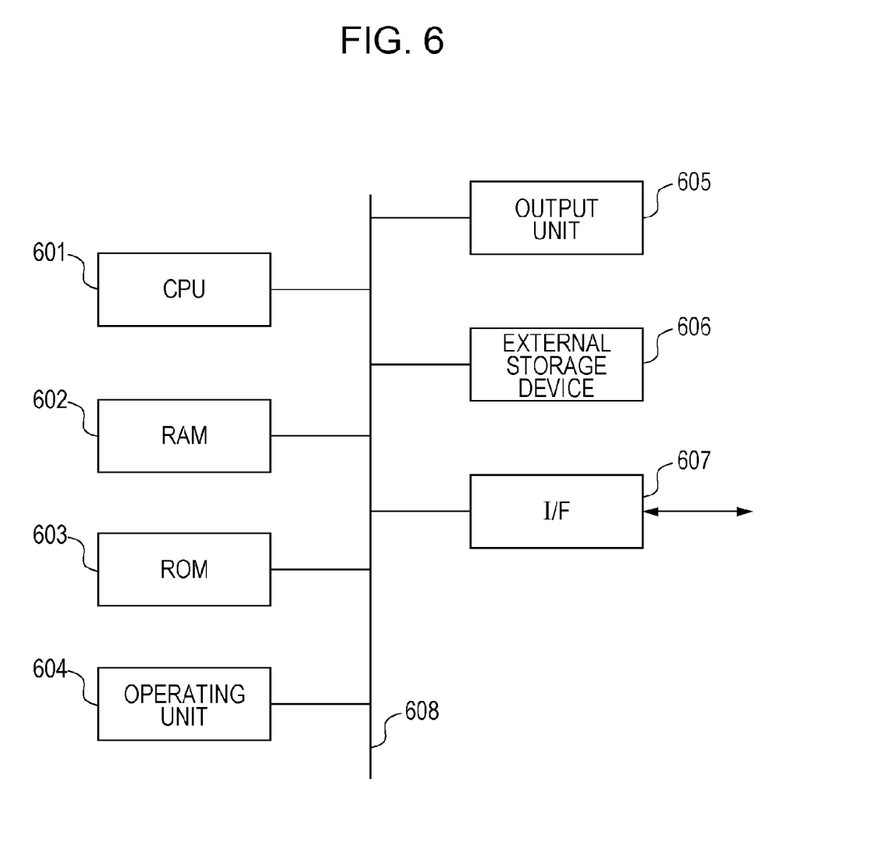
FIG. 6 is a hardware configuration example of a computer to which the present invention is applicable.

FIG. 6 is a block diagram illustrating a hardware configuration example of a computer which is applicable to an encoding apparatus according to any one of the aforementioned embodiments.

A CPU 601 controls the entire computer by using computer programs or data stored in a RAM 602 or a ROM 603 and performs the processing described to be performed by an encoding apparatus according to any one of the embodiment. In other words, the CPU 601 functions as the components 101 to 110 in FIG. 1.

The RAM 602 has an area for temporarily storing a computer program or data loaded from an external storage device 606 and/or data externally acquired through an interface (I/F) 609. Furthermore, the RAM 602 has a work area to be used for performing processing by the CPU 601. In other words, the RAM 602 can be assigned as frame memory or can provide other areas as required.

The ROM 603 stores setting data and/or a boot program for the computer. An operating unit 604 includes a keyboard and/or a mouse, for example, and is operated by a user of the computer to input an instruction to the CPU 601. A display unit 605 displays a processing result by the CPU 601. The display unit 605 may be a hold type display device such as a liquid crystal display or an impulse type display device such as a field-emission type display device, for example.

The external storage device 606 is a large-capacity information storage device such as a hard disk drive. The external storage device 606 may store an operating system (OS) and/or a computer program for causing the CPU 601 to implement functions of the components illustrated in FIG. 1 and the flow illustrated in FIG. 2. The external storage device 606 may further store image data to be processed.

A computer program and/or data stored in the external storage device 606 is loaded to the RAM 602 under the control by the CPU 601 as required and is to be processed by the CPU 601. To the I/F 607, a network such as a LAN and the Internet and/or other apparatuses may be connected. The computer may receive and transmit various information through the I/F 607. A bus 608 connects the components described above.

The operations in this configuration are implemented by performing the operations described in the flowchart mainly by the CPU 601.

[Other Embodiments]

The present invention is applicable to a system including a plurality of apparatuses (such as a host computer, an interface device, a reader and a printer) or to an apparatus including one device (such as a copying machine, a facsimile machine).

According to the present invention, a storage medium which records code of computer programs implementing the aforementioned functions is supplied to a system, and the system reads the code of the computer program. In this case, the code itself of the computer program read from the storage medium implements the functions of any one of the embodiments. The storage medium which stores code of the computer program is included in the present invention. The present invention also includes the case where an operating system (OS), for example, which runs on a computer performs a part or all of actual processing on the basis of the instruction of code of the program and the processing implements the aforementioned functions are implemented.

The following embodiments may further be implemented. That is, computer program code read from a storage medium is written to a function extension card inserted to a computer or a memory included in a function extension unit connected to a computer. The present invention also includes the case where a CPU included in a function extension card or function extension unit performs a part or all of actual processing on the basis of the instruction of code of the computer program and the processing implements the aforementioned functions are implemented.

When the present invention is applied to the aforementioned storage medium, the storage medium stores code of the computer program corresponding to the aforementioned flowchart.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-070327 filed on Mar. 25, 2010, which is hereby incorporated by reference herein in its entirety.

What is claimed is:

1. A control method for an encoding apparatus which performs rate control, the method comprising:

a first acquiring step of acquiring an evaluation value based on a rate of actually encoded first data; and a first setting step of setting a first quantization parameter to be used for quantizing second data subsequent to the first data, wherein, in the first setting step, a rate of a variation of the first quantization parameter to the evaluation value is smaller in a case where change based on whether the evaluation value is within a predetermined range, and wherein, in the first setting step, the first quantization parameter is set based on a number of frames from a frame corresponding to the second data to a last intra frame before the frame corresponding to the second data by use of the predetermined range in which an upper limit value of the predetermined range is larger in a case where the number of frames is smaller than a first value than in a case where the number of frames is larger than the first value.

2. The control method according to claim 1, further comprising a calculating step of calculating the evaluation value based on a proportion of the rate of the actually encoded first data against a preset rate of the first data.

3. The control method according to claim 1, wherein a lower limit value of the predetermined range is a value based on the number of frames between a frame corresponding to the second data and an intra frame immediately preceding the frame.

4. The control method according to claim 3, wherein the predetermined range if the number of frames between the frame and the intra frame immediately preceding the frame is lower than a predetermined number is larger than the predetermined range if the number of frames is more than a predetermined number.

5. The control method according to claim 1, further comprising a second setting step of, if the evaluation value is not within the predetermined range, setting a second quantization parameter on the basis of the evaluation value acquired by the first acquisition step as the quantization parameter to be used for quantizing the second data.

6. The control method according to claim 5, wherein the second setting step sets the second quantization parameter which is higher than the first quantization parameter if the evaluation value is higher than an upper limit value of the predetermined range.

7. The control method according to claim 5, wherein the second setting step sets the second quantization parameter which is lower than the first quantization parameter if the evaluation value is lower than a lower limit value of the predetermined range.

8. The control method according to claim 1, further comprising a second acquiring step of acquiring a base value as the quantization parameter to be used for quantizing the second data,
wherein, if the evaluation value is within the predetermined range, the first setting step sets, as the quantization parameter to be used for quantizing the second data, the base value acquired by the second acquiring step.

9. The control method according to claim 8, wherein the base value is a value based on a quantization parameter used for quantizing the first data which has been encoded prior to the second data.

10. The control method according to claim 8, wherein the base value is an average value of quantization parameters used for quantizing data of a plurality of rate control units which have been encoded prior to the second data.

11. The control method according to claim 1, wherein the first setting step sets as the quantization parameter to be used for quantizing the second data a quantization parameter used for quantizing the first data if the evaluation value is within the predetermined range.

12. The control method according to claim 1, wherein the evaluation value is a value based on the rate of the actually encoded first data and a preset rate of the first data.

13. The control method according to claim 1, wherein, in the first setting step, the first quantization parameter is set such that the rate of the variation of the first quantization parameter to the evaluation value is smaller in a case where the evaluation value is within the predetermine range than in a case where the evaluation value is not within the predetermined range.

14. An encoding apparatus which performs rate control, the encoding apparatus comprising:
a first acquiring unit configured to acquire an evaluation value based on a rate of actually encoded first data; and
a first setting unit configured to, set a first quantization parameter to be used for quantizing second data subsequent to the first data,
wherein, a rate of a variation of the first quantization parameter to the evaluation value is smaller in a case where change based on whether the evaluation value is within a predetermined range, and
wherein, in the first setting step, the first quantization parameter is set based on a number of frames from a frame corresponding to the second data to a last intra frame before the frame corresponding to the second data by use of the predetermined range in which an upper limit value of the predetermined range is larger in a case where the number of frames is smaller than a first value than in a case where the number of frames is larger than the first value.

15. A non-transitory computer-readable storage medium storing a computer program for causing a computer to execute a method comprising:
a first acquiring step of acquiring an evaluation value based on a rate of actually encoded first data; and
a first setting step of setting a first quantization parameter to be used for quantizing second data subsequent to the first data,
wherein, in the first setting step, a rate of a variation of the first quantization parameter to the evaluation value is smaller in a case where change based on whether the evaluation value is within a predetermined range, and
wherein, in the first setting step, the first quantization parameter is set based on a number of frames from a frame corresponding to the second data to a last intra frame before the frame corresponding to the second data by use of the predetermined range in which an upper limit value of the predetermined range is larger in a case where the number of frames is smaller than a first value than in a case where the number of frames is larger than the first value.

* * * * *